(12) United States Patent
Gamble et al.

(10) Patent No.: US 9,038,155 B2
(45) Date of Patent: May 19, 2015

(54) AUDITABLE MULTICLAIM SECURITY TOKEN

(75) Inventors: Rosanne Gamble, Tulsa, OK (US); Robert Baird, Tulsa, OK (US)

(73) Assignee: University of Tulsa, Tulsa, OK (US)

(*) Notice: Subject to any disclaimer, the term of this patent is extended or adjusted under 35 U.S.C. 154(b) by 378 days.

(21) Appl. No.: 13/310,280

(22) Filed: Dec. 2, 2011

(65) Prior Publication Data

US 2013/0145450 A1  Jun. 6, 2013

(51) Int. Cl.
*H04L 29/00* (2006.01)
*H04L 29/06* (2006.01)

(52) U.S. Cl.
CPC .................................. *H04L 63/0807* (2013.01)

(58) Field of Classification Search
USPC ............................................................ 726/9
See application file for complete search history.

(56) References Cited

U.S. PATENT DOCUMENTS

| | | |
|---|---|---|
| 6,968,456 B1 | 11/2005 | Tripathi et al. |
| 7,395,436 B1 | 7/2008 | Nemovicher |
| 2005/0251853 A1 | 11/2005 | Bhargavan et al. |
| 2006/0143462 A1 | 6/2006 | Jacobs |
| 2006/0212270 A1* | 9/2006 | Shiu et al. .................... 702/188 |
| 2007/0143835 A1* | 6/2007 | Cameron et al. .................. 726/9 |
| 2007/0277231 A1 | 11/2007 | Medvinsky et al. |
| 2008/0065892 A1 | 3/2008 | Bailey et al. |
| 2008/0066170 A1 | 3/2008 | Dillaway et al. |
| 2008/0222425 A1 | 9/2008 | Buss |
| 2011/0016229 A1 | 1/2011 | O-Toole, Jr. |

FOREIGN PATENT DOCUMENTS

WO    WO2009083478    7/2009

* cited by examiner

*Primary Examiner* — Jeffrey Pwu
*Assistant Examiner* — Michael D Anderson
(74) *Attorney, Agent, or Firm* — McAfee & Taft

(57) ABSTRACT

The current invention provides a paradigm for securely transmitting messages using an auditable message token and associated protocol for recording information pertaining to events occurring with respect to transmission(s) of a message.

21 Claims, 4 Drawing Sheets

AUDITABLE MULTICLAIM SECURITY TOKEN

BACKGROUND

Web services communicate across networks. Network communications, however, are susceptible to various attacks, including web service, web server, and application server security attacks. Further, network communications can be improperly shared with unauthorized parties without the knowledge of others in the communications chain.

Consequently, there exists a desire to conduct secure network communications which cannot be shared with unauthorized parties without the knowledge of others in the communication chain.

SUMMARY

One aspect relates to a method of transmitting a message, the method including: issuing a request for an auditable message token to a token provider using a source service, generating and logging an auditable message token using the token provider, sending the auditable message token to the source service using the token provider, receiving the auditable message token at the source service, and configuring and subsequently sending the message to a target service using said source service.

Another aspect relates to a networked computer system configured to send a message, said networked computer system comprising: a source service, a target service and a token provider, wherein the source service is in communication with the target service, and the token provider is in communication with the source service and the target service. In this aspect, the source service is configured to create and modify a message, transmit data to and from a token provider, and send a message to a target service. In this aspect, the target service is configured to: receive the message from the source service, and transmit data to and from the token provider. In this aspect, the token provider is configured to: transmit data to and from the source service and the target service, create the auditable message token, and log the auditable message token data and data transmitted between the token provider and the source and target services.

Yet another aspect relates to a computer-readable storage medium storing instructions that, upon execution at a token provider, causes the token provider to perform a method for recording a message transmission from a source service to a target service. The method comprises the steps of generating an auditable message token upon request by said source service, sending the auditable message token to the source service, and receiving confirmation data from the target service confirming receipt of the message.

Additional features and advantages of the invention will be set forth in the description which follows, and in part will be obvious from the description, or may be learned by the practice of the invention. These and other features of the present invention will become more fully apparent from the following description and appended claims, or may be learned by the practice of the invention as set forth hereinafter.

DRAWINGS

DETAILED DESCRIPTION

Figure 1:
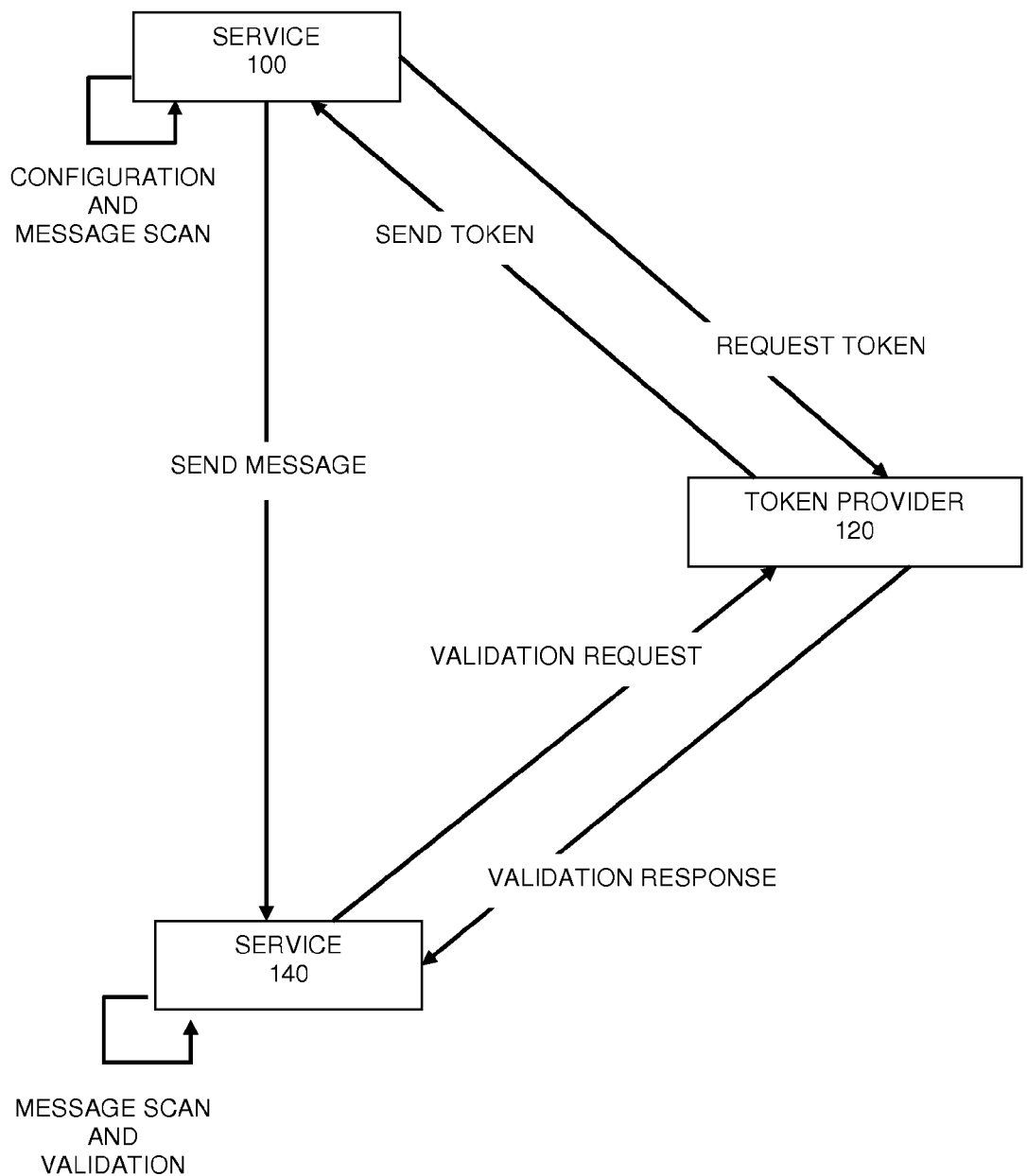
FIG. 1 depicts an overview of an illustrative embodiment of the networked computer system and a single message transmission.

Disclosed embodiments generally relate to a data transmission protocol involving an auditable message token. Use of auditable message tokens permits maintenance of auditable records of the events occurring in the transmission chain.

As used herein, the terms token, auditable token and auditable message token are defined as an auditable multi-claim security (AMS) token. Auditable tokens contain one or more populatable user-defined instantiated data elements which have the capacity for population, expansion or addition by service endpoints and/or token providers. Use of the auditable token permits the creation of auditable records of the transmission process and security claims made by endpoint services, permitting either the token provider or the token itself, or both, to create a record of events. Recordable events include, but are not limited to, timestamps, transmissions, receipts, scan results, attacks, the order of invocation of services, when/whether a message exited the trust chain to interact with untrusted services, and client identities, indicia of insider attacks and other such information.

Without limitation, the populatable data elements of the disclosed auditable message token include:

ID Trail (for serially recording the identity of each service in the historic transmission/receipt trail);

Source Service ID (for recording the identity of the immediate sending service);

Scan Results (for recording whether any reportable events have been identified by a message handler);

Request Time (for recording the time when the source service requests generation, validation, or delegation of the token);

Token ID (for recording the identity information for the token itself); and

Token Validation Status (for recording the current validity of the token).

While none of the listed populatable data elements must be included in the token during generation of the auditable message token, typically one or more populatable data elements will be included in the token and any combination or permutation may be optionally included. In the illustrative embodiment, population of the populatable data elements occurs at the token provider. However, a service may optionally be configured such that the service populates the populatable data elements.

Additional populatable data fields selected from the above list may be added to the token either by a service or by the token provider subsequent to initial token generation. Additional or alternative data elements, such as Transmission Time, Number of Transmission Attempts, Quality of Service Metrics, Historical Attack Details, Message Meta-Data, User Authentication Data, and Service Deployment Details, may be user-defined and instantiated in alternative embodiments as desired based on the information to be audited, tracked and/or recorded.

The illustrative embodiment uses a modified form of the existing open standard WS-Trust communication protocol for web services security. Specifically, WS-SecureConversation version 1.3 and WS-Trust version 1.3 have been utilized in the illustrative embodiment. In the illustrative embodiment, the WS-SecureConversation and WS-Trust protocols are modified to include (1) a mandatory validation request upon the receipt of any new message at a service; (2) a mandatory attachment of the WS-SecureConversation SecurityContext-Token for WS-Trust issue and validate requests; (3) a mandatory inclusion of the auditable message token inside the payload of the SecurityContextToken; (4) an optional inclusion of scan details as claims in the WS-Trust token request messages; (5) a mandatory delegation request upon the attempt of a service to invoke or communicate with another service; and (6) a mandatory attachment of the auditable message token to all simple object access protocol (SOAP) request messages and response messages transmitted between service endpoints.

The WS-SecureConversation security context was optionally selected as the base protocol based on its applicability to SOAP environments. SOAP environments were optionally selected based on the common use of the Extensible Markup Language (XML). Embodiments described herein refer to these specifications. In alternative embodiments, one or more different specifications can be used to facilitate communications between the various elements in the networked computer system. One acceptable alternative is the WS-Security standard BinarySequrityToken element, which can optionally be made to store and maintain the auditable message token and its populatable data elements.

FIG. 1 depicts an overview of an illustrative embodiment of the networked computer system and a single message transmission. FIG. 1 depicts service 100, also referred to as source service, client or endpoint 100, token provider 120, also referred to as claim authority or enhanced security token service (ESTS) 120, and service 140, also referred to as target service or endpoint 140. As depicted in FIG. 1, service 100, token provider 120 and service 140 have the capacity to pass electronic data between each other over one or more networks. In referring to services 100 and 140, the disclosed embodiments refer to the whole deployment of a service on an application server, which can include a web archive (.WAR) file. Consequently, those skilled in the art will recognize that functions carried out by service 100 or 140 are carried out via subroutines, handlers, interceptors, and the configuration of the application server.

The message transmission depicted in FIG. 1 may be carried out on a local area network (LAN) or a wide area network (WAN), a wired network or a wireless network. Service 100, token provider 120 or service 140 may reside on any suitable platform presently known or after arising. Thus, service 100, token provider 120 or service 140 need not reside on any particular piece of equipment, e.g., a server, a desktop computer, a handheld device, etc. Although FIG. 1. shows service 100, token provider 120 and service 140 as separate entities, in an alternate embodiment two or more entities can optionally reside within the same entity.

Service 100 and service 140 are trusted services, meaning that service 100 and service 140 are in a trust chain and have previously been designated as standing in a trusted security relationship with respect to one another. Consequently, service 100 and service 140 have the capacity and permission to transmit data to each other within the security protocol of the illustrative embodiment.

Encapsulated within service 100 and service 140 are message handlers and attack handlers.

Message handlers provide a mechanism to access information in the header and body parts of the SOAP message. The standard for processing a WS-SecureConversation context session includes message handlers. Message handlers must be used in the selected WS-SecureConversation protocol to establish the context session, maintain the context session, use the context session, and close the context session when communication among services is no longer necessary.

Message handlers used in the illustrative embodiment have been configured to forward information from the pre- and post-transmission scans to token provider 120. A message report containing this information accompanies the validation and delegation requests required by the illustrative embodiment. Message reports contain the information needed for token provider 120 to populate the data elements in the auditable message token. In the illustrative embodiment, message reports contain scan data, which the token provider formats into claims. An alternative embodiment modifies standard WS-SecureConversation message handlers to embed certain additional context information about attacks received from the detection handlers in the auditable message token.

Attack handlers scan messages to determine and log if attacks have occurred. The term scan as used herein is defined as the application of one or more attack handlers to a message at an endpoint. The attack handlers of the illustrative embodiment are detection handlers capable of addressing different web service security attacks. The detection handlers of the illustrative embodiment detect web service, web server, and application server security attacks, including what may be referred to as SOAP Action Spoofing, WSS4J Cipertext Signatures, XML Injection, and oversized payloads interface attacks. Additional suitable detection handlers known in the art may be optionally or alternatively utilized, including detection handlers that analyze SOAP messages for quality of service metrics or scan a web service endpoint for signs of malicious insider threats.

FIG. 1 depicts an overview of an illustrative networked computer system and an illustrative message transmission. As depicted, the example protocol begins with the initiation of a message at service 100. Service 100 conducts a pre-transmission message scan. Service 100 issues a request for an auditable message token from token provider 120. Concurrently with sending the request for an auditable message token, service 100 sends token provider 120 the results of the pre-transmission message scan in a message report. Token provider 120 generates an auditable message token, populates the Token ID, ID Trail, the Source Service ID, and the Scan Results data elements. Token provider 120 logs the token information in the logs of token provider 120. Token provider 120 sends the auditable message token to service 100 and service 100 receives the auditable message token. Service 100 configures the message for transmission, embedding the auditable message token in the header of the SOAP message. Service 100 sends the message to Service 140.

Service 140 receives the message and conducts a post-transmission message scan. Service 140 sends a message report having the results of the post-transmission scan to token provider 120. Concurrently with transmission of the message report, service 140 sends a validation request to token provider 120. The validation request confirms to token provider 120 receipt of the message at service 140. Upon receiving a validation request, token provider 120 evaluates the status of the auditable message token and informs service 140 of the validity status of the AMS token. The token will either be valid or invalid. Tokens may be invalid for a variety of reasons, including, but not limited to, timeout, token cancellation/revocation, use outside of intended scope, and token mismatch. When sending a negative validation, token provider 120 also informs service 140 of the reason for invalidating the message.

If service 140 receives a positive validation message and no attack handlers have detected an attack, service 140 accepts and processes the message. If service 140 receives a positive validation message and attack handlers have detected an attack, service 140 rejects the message and returns a fault code. If service 140 receives a negative validation message, irrespective of whether attacks have been detected, service 140 sends a fault message back to source service 120 and service 140 does not process the message.

Figure 2:
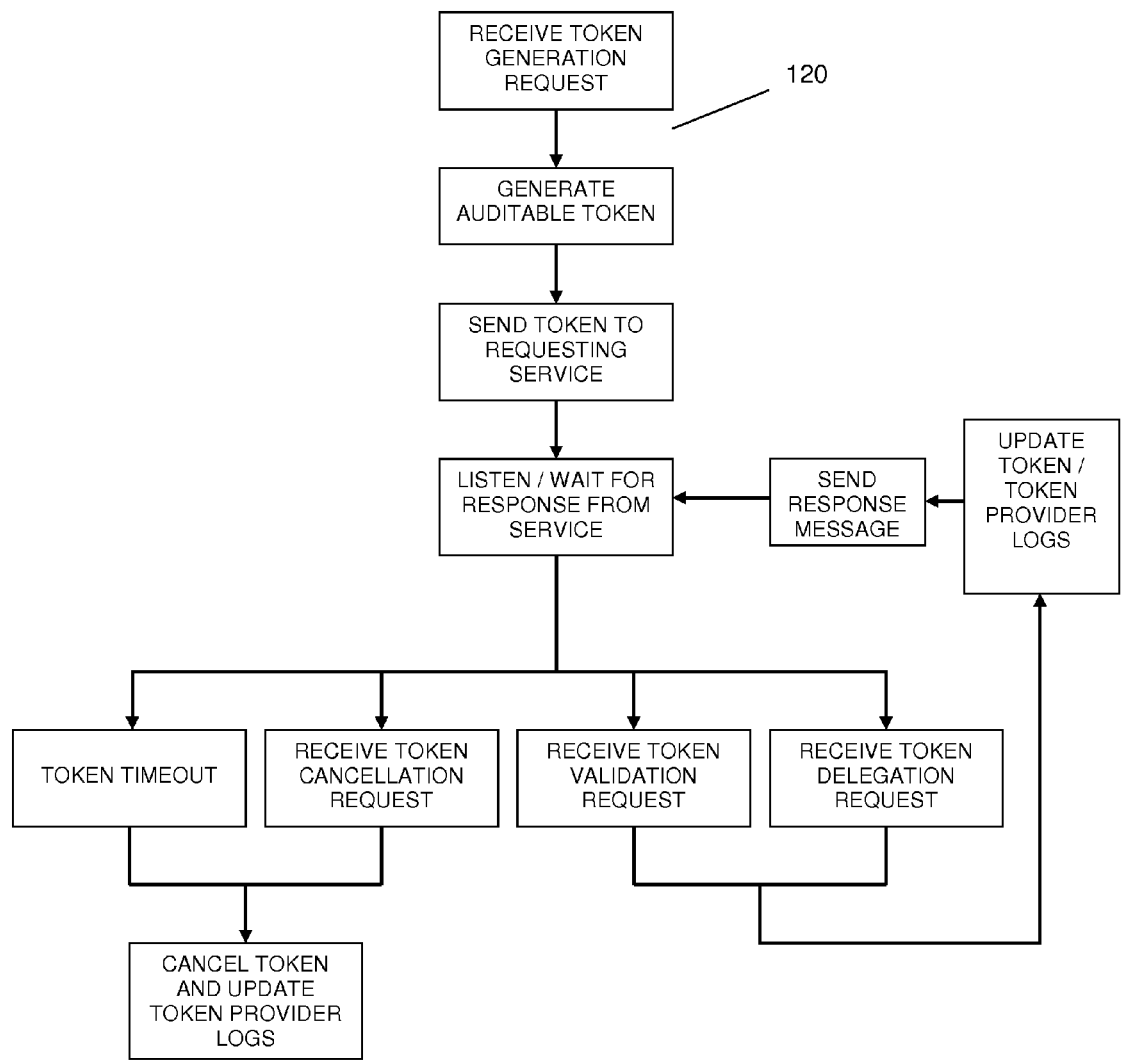
FIG. 2 depicts an operational flow path for an illustrative token provider relating to transmission of a message according to the illustrative protocol.

FIG. 2 depicts an operational flow path for an illustrative token provider 120 relating to a single auditable message token. Token provider 120 generates an auditable message token upon receiving a request for an auditable message token from a requesting service. In conjunction therewith, token provider 120 populates one or more data elements discussed herein. In alternate embodiments, token provider 120 may optionally forgo population of data elements or may populate additional or alternative data elements instantiated by a user. In conjunction with data element population, token provider 120 logs the request and logs data contained in the auditable message token. Token provider 120 sends the auditable message token to the requesting service. Token provider 120 then waits or listens for a response from a target service.

If token provider 120 receives no response from a service, token provider 120 times out and cancels the token, updating the logs of token provider 120 to reflect token cancellation.

If token provider 120 receives a request for token cancellation from a service authorized to cancel the token, token provider 120 cancels the auditable message token and updates the logs of token provider 120 to reflect token cancellation.

If token provider 120 receives a request for token validation and a concurrent message report from a requesting service, token provider 120 evaluates the request against information contained in the logs of token provider 120, extracts the claims data from the message report, updates the logs of token provider 120, updates the auditable message token and sends the appropriate verification response message. If the auditable message token is invalid, the validation routine does not update the token. Following transmission of a verification response message, the listening period for token provider 120 described above begins again and the protocol iteratively continues until the token is timed out, cancelled or failed.

Token provider 120 may receive a request for token delegation and a concurrent message report from a requesting service. Delegation means that the requesting service intends to transmit a message having the auditable message token to a new target service. In so doing, the requesting target service assumes the role of the source service and a new target service is selected. Upon receipt of a request for token delegation and a concurrent message report from a requesting service, token provider 120 updates the auditable message token and the internal logs of token provider 120, and sends a delegation authorization response message to the requesting service. Following transmission of a delegation authorization response message, the listening period for token provider 120 described above begins again and the protocol recursively continues until the token is timed out, cancelled or failed.

Alternate embodiments may eliminate the token validation routine, the token delegation routine, or both validation and delegation routines. In embodiments which eliminate token validation, a request for delegation and concurrent message report confirm receipt of the message and provide the necessary claims data to token provider 120. In embodiments which eliminate token delegation, the token validation request and the concurrent message report informs token provider 120 that the message has been received and provides the necessary claims data. In embodiments which eliminate both validation and delegation routines, the service endpoints update the token and send a message report to token provider 120 using a non-standard WS-Trust mechanism or an alternate security protocol.

Alternate embodiments eliminate the separately recorded log at token provider 120, relying on the auditable message token to preserve the desired record.

Alternate embodiments use token provider 120 to verify the authorization status of target service 140 prior to transmission. In such embodiments, source service 110 sends the identity of target service 140 to token provider 120 prior to message transmission. Token provider 120 verifies that target service 140 is an authorized service, logs the information, updates the token if needed and sends a verification message to source service 110 with the authorization status of target service 140.

Although the illustrative embodiment manipulates the auditable message token solely at token provider 120, alternate embodiments may optionally manipulate the auditable message token solely at the services 100, 140, or in conjunction with token provider 120.

Figure 3:
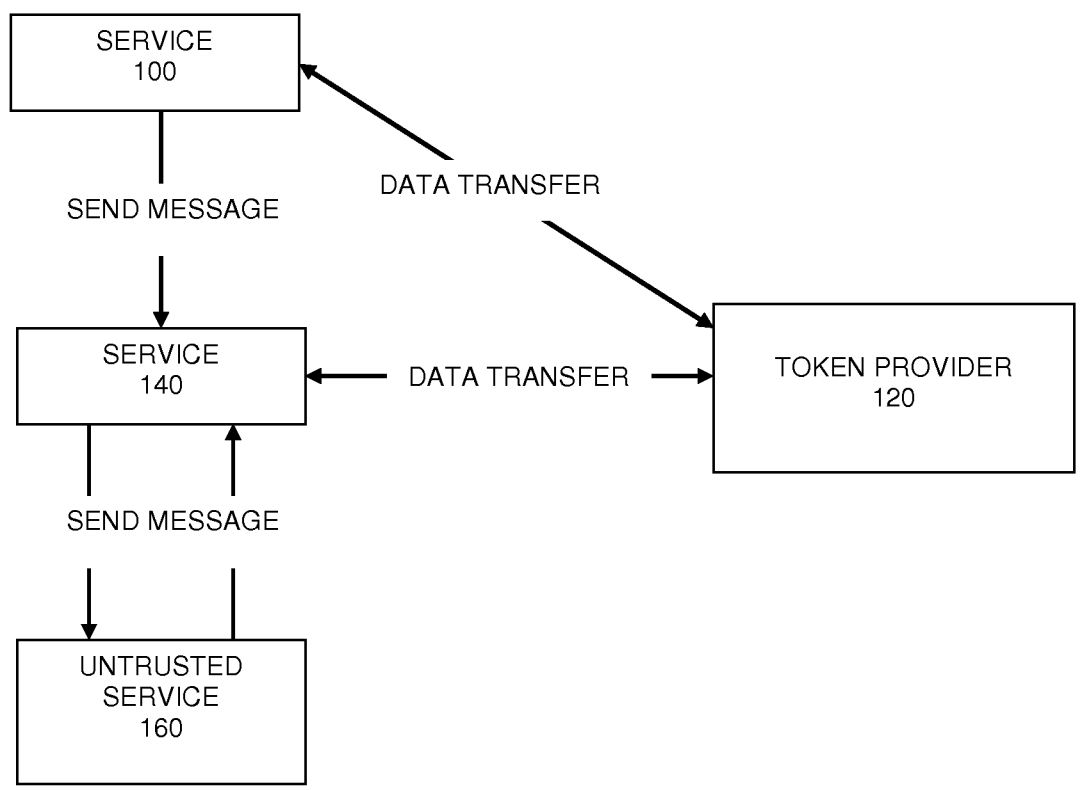
FIG. 3 is an overview of an example series of transmissions occurring via an illustrative embodiment of the networked computer system using an auditable message token.

FIG. 3 depicts an overview of an example series of transmissions occurring via an illustrative embodiment of the networked computer system using an auditable message token. FIG. 3 depicts service 100 creating and transmitting a message, having an auditable message token, to service 140 according to the protocol described in FIG. 1. Once received by service 140, service 140 sends token provider 120 a message report and an accompanying request for validation. Token provider 120 checks the validity status of the token, updates the token and sends a validation response. Upon receipt of a positive validation message, service 140 accepts the message. Service 140 subsequently sends a request for delegation and an accompanying message report to token provider 120. Token provider 120 sends the appropriate delegation response to service 140 and initiates a listening period according to the protocol described in FIG. 2.

Subsequently, service 140 sends a message outside of the trust chain of trusted services to untrusted service 160. Untrusted service 160, an unmodified service using conventional web standards, is unequipped to process the auditable message token. Consequently, if untrusted service 160 replies to the message from service 140, the expected reply response of untrusted service 160 is uncertain. Untrusted service 160 may transmit a message back to service 140 with the AMS token it received embedded in the message header. Alternately, untrusted service 160 may discard the token and transmit a message back to service 140 without a token.

If untrusted service 160 transmits a message back to service 140 with the received auditable message token embedded in the message header, upon receipt of the transmitted message, service 140 will attempt the validation protocol. Because token provider 120 is listening for a response from a target service and not service 140 (which acts as a source service following delegation authorization), token provider 120 will send a negative validation response to service 140.

If untrusted service 160 transmits a message back to service 140 without an auditable message token, upon receipt of the transmitted message, service 140 will fault and not attempt to validate the message.

In alternate embodiments, service 140 will process the unsecure message data in accordance with its standard conventions. In such alternate embodiments, if service 140 attempts to forward the unsecure message received from untrusted service 160, service 140 must request a new token from token provider 120.

In an alternate embodiment, the protocol utilized does not include validation. In such an embodiment, if untrusted service 160 transmits a message back to service 140 with the auditable message token which untrusted service 160 received, upon receipt of the transmitted message, service 140 will accept the message. If service 140 attempts to transmit a message, service 140 will initiate the transmission protocol by requesting delegation of the auditable message token from token provider 120. Because token provider 120 receives sequential requests to delegate the same token from the same service 140, auditing the auditable message token or the logs of token provider 120 will show that a message was transmitted to a service outside of the trust chain.

Figure 4:
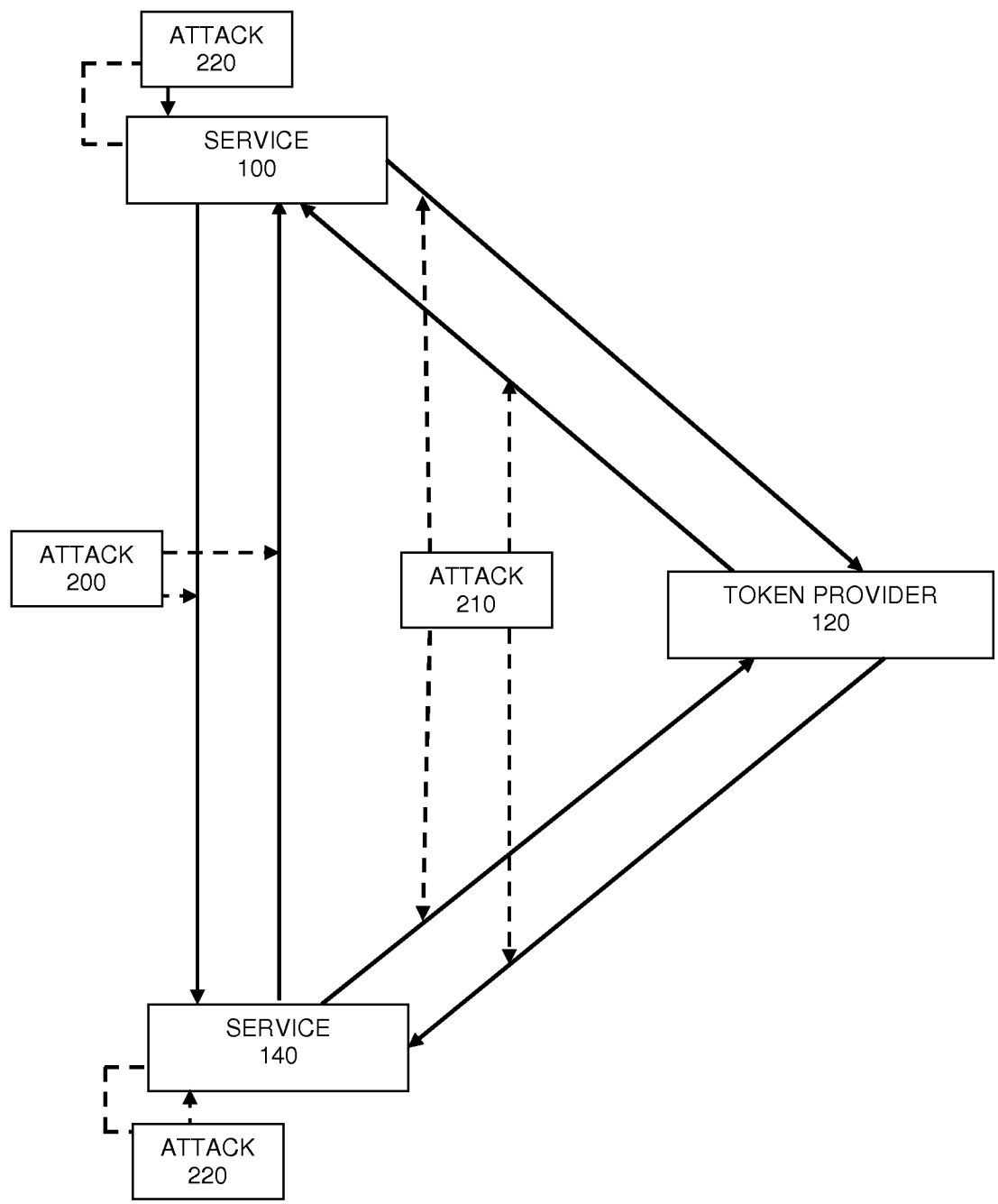
FIG. 4 depicts potential attacks for the operational flow depicted in FIG. 2.

FIG. 4 depicts an overview of an example series of transmissions occurring via an illustrative embodiment of the networked computer system using an auditable message token when subjected to various attacks. Each attack depicted may occur separately or in conjunction with any other depicted attack. Moreover, multiple attacks may be encapsulated within a single attack, e.g., an XML re-writing attack may include a SQL Injection attack. Further, while depicted and numbered as a single attack, multiple independent attacks may occur during any give data transmission sequence.

FIG. 4 depicts service 100 creating and transmitting a message having an auditable message token to service 140 according to the protocol described in FIG. 1. FIG. 4 also depicts a return message sent by service 140, which requires a delegation request under the illustrative embodiment. In each circumstance, following execution of the pre- and post-transmission scans, the detection handlers forward attack information to token provider 120. Token provider 120 uses this information to update the auditable message token and the internal logs of token provider 120. Consequently, the updated token and the logs auditably record the detection of the attack, the type of attack(s) detected along with the attack location and directionality, if any. Detection of attacks 200, 210 and 220 occurs during pre- and post-transmission scans.

Attack 200 may be a transport layer attack or a message attack, such as, for example, a sniffer, data modification or man-in-the-middle attack.

Similarly, communication between each service and the token provider 120 may be subject to attacks. Attack 210 depicts the attacks which may occur on these data transmission legs. Attack 210 may likewise be a transport layer attack or a message attack.

Any service may further be subject to an insider attack. In FIG. 4, service 140 is depicted having attack 220, e.g., in the form of an insider attack. If the pre-transmission scan fails to detect an insider attack, post-transmission scans at services 110 and 140 will detect the attack.

The illustration below shows a rudimentary illustrative example implementation of the auditable message token in a WS-Security standard context:

```
<soap:Envelope>
    <soap:Header>
        <wsse:Security>
            <wsc:SecurityContextToken>
                <AMSToken:sctID>ID_300</AMSToken:sctID>
                <AMSToken:identityTrail>
                    <AMSToken:identity>
                        <AMSToken:endpoint>Client</AMSToken:endpoint>
                        <AMSToken:timestamp>5/17/11 9:17 AM
                            </AMSToken:timestamp>
                        <AMSToken:attackDetails>No attacks.
                            </AMSToken:attackDetails>
                    </AMSToken:identity>
                    <AMSToken:identity>
                        <AMSToken:endpoint>TravelAgency</AMSToken:endpoint>
                        <AMSToken:timestamp>5/17/11 9:17 AM
                            </AMSToken:timestamp>
                        <AMSToken:tokenStatus>http://docs.oasis-open.org/ws-
                            sx/ws-trust/200512/status/valid</AMSToken:tokenStatus>
                        <AMSToken:attackDetails>No attacks.
                            </AMSToken:attackDetails>
                    </AMSToken:identity>
                </AMSToken:identityTrail>
            </wsc:SecurityContextToken>
        </wsse:Security>
    </soap:Header>
    <soap:Body>
        <ns2:getCondoset>
            < ns2:arg0>
                < ns2:departure_place>Tulsa</ ns2:departure_place>
                < ns2:destination>Chicago</ ns2:destination>
            </ ns2:arg0>
        </ns2:getCondoset>
    </soap:Body>
</soap:Envelope>
```

In this example, the auditable message token is instantiated within the 'SecurityContextToken' element and contains information showing both a source service identity and a target service identity. Thus, the example token includes data elements for Token ID, Source Service ID, Scan Results, Scan Time, and Target Service ID within the auditable message token. The Token ID element is populated with 'ID_300.' The Source Service ID element is populated with 'Client' and the Target Service ID element is populated with 'TravelAgency.' The illustrative token further includes several timestamp elements. The illustrative token uses timestamp elements to indicate the time the token issued for the Source Service ID element, the time the token provider received a corresponding request, and the time of validation for every other identity added to the token. The Scan Results element follows both the Target Service ID and the Source Service ID sections of the auditable message token. The Scan Results elements are labeled 'attackDetails'. Both Scan Results elements are populated with 'No attacks'. The token further shows that the target service has received and affirmatively validated the token. Consequently, the illustrative auditable token records a successful, attack-free transmission of a message from Client to TravelAgency.

The illustration below depicts an updated version of the above auditable message token. In the illustration below, a message was transmitted from TravelAgency to a new target service, which is recorded in the token under a new Target Service ID data element labeled 'CondoService', ing the relevant token at the token provider. Alternate embodiments do not use this double-redundancy scheme and eliminate the log at the token provider. Other embodiments alternately or duplicatively maintain logs at the service.

The disclosed embodiments described above are provided by way of illustration only and should not be construed to limit the invention. Those skilled in the art will readily recognize various modifications and changes which may be made to the disclosed embodiments without departing from the true spirit and scope of the disclosure or the following claims.

What is claimed is:

1. A method of transmitting a message, comprising the steps of:

```
<soap:Envelope>
    <soap:Header>
        <wsse:Security>
            <wsc:SecurityContextToken>
                <AMSToken:sctID>ID_300</AMSToken:sctID>
                <AMSToken:identityTrail>
                    <AMSToken:identity>
                        <AMSToken:endpoint>Client</AMSToken:endpoint>
                        <AMSToken:timestamp>5/17/11 9:17 AM
                            </AMSToken:timestamp>
                        <AMSToken:attackDetails>No attacks.
                            </AMSToken:attackDetails>
                    </AMSToken:identity>
                    <AMSToken:identity>
                        <AMSToken:endpoint>TravelAgency</AMSToken:endpoint>
                        <AMSToken:timestamp>5/17/11 9:17 AM
                        </AMSToken:timestamp>
                        <AMSToken:tokenStatus>http://docs.oasis-open.org/ws-
                            sx/ws-trust/200512/status/valid</AMSToken:tokenStatus>
                        <AMSToken:attackDetails>No attacks.
                            </AMSToken:attackDetails>
                    </AMSToken:identity>
                    <AMSToken:identity>
                        <AMSToken:endpoint>CondoService</AMSToken:endpoint>
                        <AMSToken:timestamp>5/17/11 9:17 AM
                        </AMSToken:timestamp>
                        <AMSToken:tokenStatus>http://docs.oasis-open.org/ws-
                            sx/ws-trust/200512/status/valid</AMSToken:tokenStatus>
                        <AMSToken:attackDetails>Attack detected: XML Injection
                            Attack. </AMSToken:attackDetails>
                    </AMSToken:identity>
                </AMSToken:identityTrail>
            </wsc:SecurityContextToken>
        </wsse:Security>
    </soap:Header>
    <soap:Body>
        < soap:Fault>
            <soap:faultcode> Attack</ soap:faultcode>
            < soap:faultstring>XML Injection Attack</ soap:faultstring>
        </ soap:Fault>
    </soap:Body>
</soap:Envelope>
```

As with the prior illustration, the 'tokenStatus' element records that the new target service received the transmitted message and associated token. A new Scan Results element is labeled 'attackDetails'. The post-transmission scan at CondoService revealed an XML injection attack. Consequently, the updated Scan Results element is labeled 'Attack detected: XML Injection Attack.' The body of the above message contains a notification from CondoService informing its source service ('TravelAgency') of the fault triggered by the attack detection.

In the disclosed embodiments, an end user with access privileges can review the auditable message token information at a service or at a token provider. Further, a principal can review the logs concerning processing of messages contain-issuing a request for an auditable message token to a token provider using a source service;
generating and logging said auditable message token using said token provider, wherein said auditable message token is generated based on said request and said auditable message token permits the creation and inclusion into said auditable message token of auditable and changeable records of transmissions of said message made by endpoint services;
sending said auditable message token to said source service using said token provider;
receiving said auditable message token at said source service;
configuring and subsequently sending said message to a target service using said source service, wherein said configuring includes embedding said auditable message token within said message within said message; and updating and logging said auditable message token using said token provider to reflect a transmission ID Trail.

2. The method of claim 1, following receipt of said message at said target service, further comprising the following post-transmission steps:
sending a request for auditable message token validation to said token provider, upon receipt of which said token provider processes said validation request and sends a validation response to said target service;
processing said message based on said validation response from said token provider.

3. The method of claim 1, further comprising transmitting said message using said target service after receiving said message at said target service, wherein:
said target service assumes the role of said source service, a new target service is selected, and the following steps are performed;
issuing a request for delegation of said auditable message token to said token provider using said target service, which has assumed the role of said source service;
updating and logging said auditable message token using said token provider to reflect said transmission ID Trail and additional security claims;
sending said delegation authorization response to said target service using said token provider; and
receiving said delegation authorization response at said target service.

4. The method of claim 2, further comprising the step of said target service performing a post-transmission message scan.

5. The method of claim 4, wherein the results of said post-transmission message scan are sent by said target service to said token provider.

6. The method of claim 1 wherein said source service and said token provider reside on the same machine.

7. The method of claim 1, further comprising the steps of performing a pre-transmission message scan using said source service and sending said results of said pre-transmission message scan and the identity of said target service to said token provider using said source service, upon receipt of which said token provider performs the following steps:
logs the identity of said target service;
verifies said auditable message token is still valid;
logs said pre-transmission message scan results; and
sends the results of said verification step to said source service.

8. The method of claim 1, wherein said message is a Simple Object Access Protocol message and the step of configuring said message further includes embedding said auditable message token in the header of said Simple Object Access Protocol message.

9. The method of claim 1, wherein said auditable message token includes at least one populatable data element selected from ID Trail, Scan Results, and Token Validation Status, wherein the step of configuring said message further includes populating at least one said populatable data element.

10. A networked computer system configured to send a message, said networked computer system comprising:
a source service, a target service and a token provider, wherein
said source service is in communication with said target service;
said token provider is in communication with said source service and said target service;
said source service is configured to:
create and modify a message;
transmit data to and from a token provider; and
send a message to a target service;
said target service is configured to:
receive said message from said source service; and
transmit data to and from said token provider; and
said token provider is configured to:
transmit data to and from said source service and said target service;
create said auditable message token,
embed said auditable message token in said message, wherein said auditable message token permits the creation and inclusion into said auditable message token of auditable and changeable records of security claims made by endpoint services;
log said auditable message token data and data transmitted between said token provider and said source and target services; and update and log said auditable message to reflect additional security claims.

11. The networked computer system of claim 10, wherein said target service is also configured to:
request delegation of said auditable message token from said token provider;
configure said message using said auditable message token; and
send said message to a second target service; and
said token provider is also configured to delegate said auditable message token.

12. The networked computer system of claim 10, wherein said source service is further configured to perform a pre-transmission message scan.

13. The networked computer system of claim 10, wherein said target service is further configured to perform a post-transmission message scan.

14. The networked computer system of claim 10, wherein said auditable message token includes at least one populatable data element selected from ID Trail, Scan Results, and Token Validation Status and said token provider or said source service is configured to populate at least one said populatable data element.

15. The networked computer system of claim 10, wherein said token provider is further configured to verify logged data against data received from said source and target services.

16. A computer-readable non-transitory storage medium storing instructions that, upon execution at a token provider, causes the token provider to perform a method for recording a message transmission from a source service to a target service, comprising the following steps:
generating an auditable message token upon request by said source service;
logging the generation of said auditable message token;
sending said auditable message token to said source service wherein said auditable message token is embedded into a message; and
receiving confirmation data from said target service confirming receipt of said message containing the thus embedded token;
logging the receipt of said message by said target service;
comparing confirmation data with token provider data to validate said auditable message token; and
modifying said auditable message token using said confirmation data and validation results.

17. The storage medium of claim 16, wherein said confirmation data is a request for delegation of said auditable message token.

18. The storage medium of claim 16, wherein said auditable message token includes at least one populatable data element selected from ID Trail, Scan Results, and Token Validation Status.

19. The storage medium of claim 16, wherein said method further comprises the step of populating at least one said populatable data element.

20. The method of claim 1 wherein said auditable message token permits the creation and inclusion of auditable and changeable records of security claims made by endpoint services into said auditable message token.

21. The method of claim 10 wherein said auditable message token permits the creation and inclusion of records of the transmissions made by endpoint services into said auditable message token.

* * * * *